United States Patent
Yuyama

(10) Patent No.: US 6,638,003 B2
(45) Date of Patent: Oct. 28, 2003

(54) APPARATUS FOR TAKING OUT PTP TABLET SHEETS

(75) Inventor: Shoji Yuyama, Toyonaka (JP)

(73) Assignee: Yuyama Mfg. Co., Ltd., Toyonaka (JP)

(*) Notice: Subject to any disclaimer, the term of this patent is extended or adjusted under 35 U.S.C. 154(b) by 0 days.

(21) Appl. No.: 10/017,399

(22) Filed: Dec. 18, 2001

(65) Prior Publication Data

US 2002/0131857 A1 Sep. 19, 2002

(30) Foreign Application Priority Data

Dec. 28, 2000 (JP) ........................................ 2000-400962

(51) Int. Cl.[7] ............................................... B65G 59/06
(52) U.S. Cl. ..................... 414/797.8; 221/251; 221/310
(58) Field of Search ........................... 414/797.8, 798.1; 221/211, 251, 278, 310

(56) References Cited

U.S. PATENT DOCUMENTS

| | | | | |
|---|---|---|---|---|
| 2,738,899 A | * | 3/1956 | Hansen et al. | 221/251 |
| 4,323,169 A | * | 4/1982 | Guigan | 221/124 |
| 4,647,265 A | * | 3/1987 | Uno | 414/790.2 |
| 5,645,392 A | * | 7/1997 | Leichty et al. | 414/416.01 |
| 5,941,681 A | * | 8/1999 | Piotrowski et al. | 414/797.8 |

FOREIGN PATENT DOCUMENTS

| | | |
|---|---|---|
| JP | 4-269965 | 9/1992 |
| JP | 4-269967 | 9/1992 |
| JP | 8-107922 | 4/1996 |

* cited by examiner

Primary Examiner—Janice L. Krizek
(74) Attorney, Agent, or Firm—Wenderoth, Lind & Ponack, L.L.P.

(57) ABSTRACT

A tablet sheet removing apparatus in which tablet sheets (S) are contained in a stacked state within a tablet sheet containing portion (1). Among the tablet sheets (S), at least two tablet sheets (S1, S2), forming the discharge side, are supported separately. A discharge portion (3) sucks and holds only the first tablet sheet (S1) from the discharge side among the tablet sheets (S) supported by an elastic support portion (2) to move and discharge it. Thus, in spite of the stacked direction of the tablet sheets, only one tablet sheet (S1) can be discharged.

14 Claims, 4 Drawing Sheets

(a)

(b)

APPARATUS FOR TAKING OUT PTP TABLET SHEETS

BACKGROUND OF THE INVENTION

The present invention relates to an apparatus for taking out PTP tablet sheet.

As shown in FIG. 4, a press through package (PTP) type of tablet sheet S has a construction in which tablets are contained in recesses formed by expanding the sheet body toward the front side surface F and then an aluminum sheet is stuck on the back side surface.

Conventionally, dispensing apparatuses for automatically feeding such tablet sheet in accordance with a prescription data are disclosed in Japanese Laid-open Patent Publications Nos. H4-269965, H4-269967 and H8-107922.

However, in the above dispensing apparatuses, each tablet sheet needs to be stacked in the same direction so that each tablet sheet can be discharged separately. Namely, it is necessary to stack the tablet sheets so that the back side surface B of each tablet sheet S does not come into contact with each other, thereby forming gaps between the tablet sheets S into which claw members are securely inserted. However, as shown in FIG. 6, the tablet sheet S are boxed in a state in which the front side surface F and the front side surface F, or the back side surface B and the back side surface B are superimposed so as not to bulk up. Therefore, after taking out the tablet sheets S from the box and re-stacking them in the same direction as shown in FIG. 6, the stacked tablet sheets need to be set on the dispensing apparatus, which causing a problem of bad handling. Thus, a construction that can automatically discharge the tablet sheets without concern regarding the direction of stacking the tablet sheets has been desired.

SUMMARY OF THE INVENTION

It is an object of the present invention to provide an apparatus for taking out PTP tablet sheet, which can reliably discharge only one of the tablet sheets from tablet sheet container in spite of the stacking direction thereof.

A tablet sheet taking out apparatus according to the present invention comprises: a tablet sheet containing portion for containing tablet sheets in a stacked state; an elastic support portion which separately supports at least two tablet sheets from the discharge side among the tablet sheets contained in the tablet sheet containing portion; and a discharge means for discharging the first tablet sheet from the discharge side among the tablet sheets contained in the tablet sheet containing portion, the discharge means holding the first tablet sheet and moving it so that the elastic support portion which supports only the first tablet sheet can be bent. The tablet sheet includes PTP sheet which packs capsules and so on other than tablets.

According to this construction, in spite of the direction containing the tablet sheets, two tablet sheets from the discharge side can be surely supported by the elastic support portion. Then, sucking the first tablet sheet from the discharge side by the discharge means to hold and move it, only the elastic support portion which supports the first tablet sheet is elastically deformed, whereby the second tablet from the discharge side is maintained in a state held by the elastic support portion. Thus, only the first tablet sheet can be surely discharged.

In this case, the elastic support portion may comprise a plurality of elastic hairs in a brush-like manner which protrude toward the side edge of the tablet sheets.

According to this construction, only by making the elastic support portion access to the side edges of the stacked tablet sheets, the elastic hairs can be positioned on discharge side of each tablet sheet. Therefore, sucking the first tablet sheet from the discharge side by the discharge means to hold it, only the first sheet can be surely discharged.

In a preferred embodiment, the tablet sheet containing portion may contain the tablet sheets in a state that the front side surface and the front side surface and back side surface and the back side surface come into contact with each other.

Preferably, the discharge means comprises a suction unit which sucks and holds the first tablet sheet from the discharge side.

Preferably, the elastic support portion may be movable between a standby position where the elastic support portion retreat from the tablet sheet containing portion when containing the tablets sheets into the tablet sheet containing portion and a support position where the tablet sheets contained in the tablet sheet containing portion are supported.

Preferably, the tablet sheet containing portion may have a shutter, the shutter closing the discharge side of the tablet sheet containing portion when the elastic support portion is positioned at the standby position and opening the discharge side of the tablet sheet containing portion when the elastic support portion is positioned at the support position.

Preferably, the elastic support portion may comprise: a first elastic support portion for supporting the almost part of the stacked tablet sheets; and a second elastic support portion for supporting a few tablet sheets from the discharge side among the stacked tablet sheets.

In this case, the elastic support portion may be movable between: a standby position where the first elastic support position retreats from the tablet sheet containing portion and the second elastic support portion protrudes into the tablet sheet containing portion; and a takeout position where the first elastic support position protrudes into the tablet sheet containing portion and the second elastic support portion retreats from the tablet sheet containing portion; and wherein at the standby position, the tablet sheets contained in the tablet sheet containing portion are supported by the second elastic support portion; and at the support position, almost tablet sheets contained in the tablet sheet containing portion are supported by the first elastic support portion while a few tablet sheets from the discharge side are supported by the second elastic support portion.

DETAILED DESCRIPTION OF THE PREFERRED EMBODIMENTS

Hereinafter, embodiments according to the present invention will be described with reference to the accompanying drawings.

First Embodiment

Figure 1:
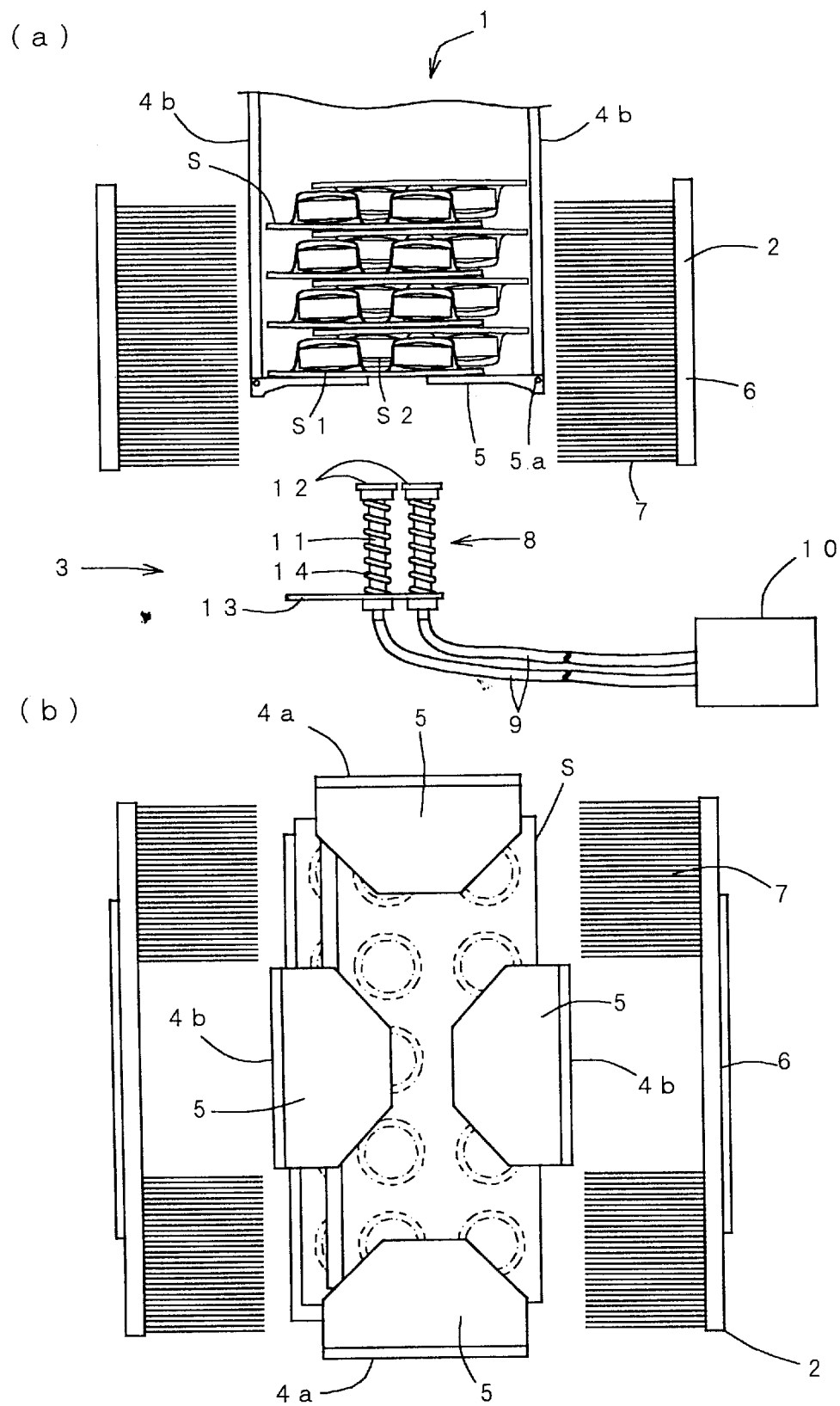
FIG. 1A is a front view showing a tablet sheet taking out apparatus on standby according to a first embodiment of the present invention and FIG. 1B is a bottom view of FIG. 1A.
Figure 2:
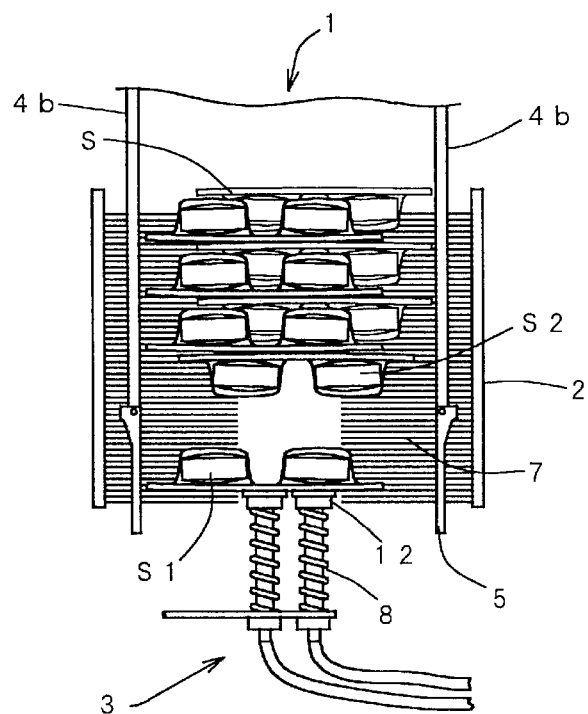
FIG. 2A is a front view showing the tablet sheet taking out apparatus of FIG. 1 in operation and FIG. 2B is a bottom view of FIG. 2A.
Figure 2:
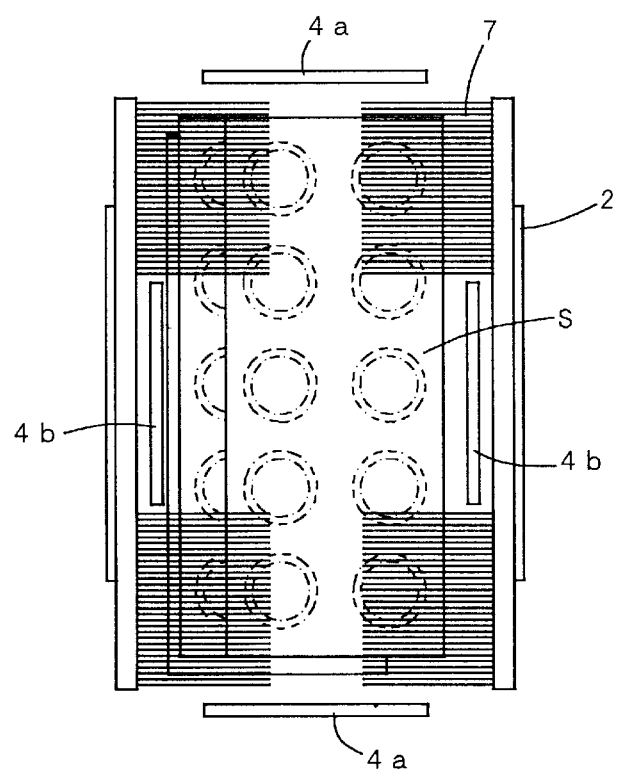

FIGS. 1(a), 1(b) and 2 show a tablet sheet taking out apparatus according to a first embodiment of the present invention. The tablet sheet taking out apparatus comprises a tablet sheet containing portion 1, an elastic support portion 2 and a discharge portion 3.

The tablet sheet containing portion 1 comprises two pairs of guide plates 4a, 4b properly connected by connecting members (not shown) and defining a space in which packed tablet sheets S can be contained. One pair of guide plates 4a guides both ends of the tablet sheets S while the other pair of guide plates 4b guides the central portion of both side edges of the tablet sheets S. On the lower end of each pair of the guide plates 4a, 4b, there is provided a shutter 5 which is pivotable around a support axis 5a. The shutter 5 is pivoted by drive means such as a motor (not shown) and positioned between a closed position (FIG. 1) in which the shutter 5 horizontally protrudes toward the guide plates 4a, 4b and an open position (FIG. 2) in which the shutter 5 is directed vertically downward.

The elastic support portion 2 comprises holding plates 6 disposed in the planes parallel to the pair of guide plates 4b and a plurality of elastic hairs 7 fixed on one surface of each holding plate 6 in a brush-like manner. The elastic hairs 7, can be formed of, for example, synthetic resin that can be thinly formed and elastically deformed. The elastic support portions 2 are disposed on a side of each of the guide plates 4b and can be positioned by driving a solenoid or a motor (not shown) between a standby position in which the elastic hairs 7 is retreated from the tablet sheet containing portion 1 as shown in FIGS. 1A, 1B and a support position in which the elastic hairs 7 enter into the tablet sheet containing portion 1 as shown in FIGS. 2A, 2B.

Since the back side surface B of the tablet sheet S is convex because of the adhesion of the aluminum sheet, even if the backside surfaces B of the stacked tablet sheets S come into contact with each other, a gap will be formed between the opposing backside surfaces B. Thus, the diameter of the elastic hairs 7 is determined so that the elastic hairs 7 can surely enter the gap. The number, the elastic force and so on of the elastic hairs 7 are also determined so that at least two tablet sheets S, positioned at the discharge side, can be separately supported.

Instead of the elastic hair 7, a band-like shape of elastic strip may be used. That is to say, any members that can be surely inserted into a gap between the stacked tablet sheets S, in particular a gap between the back side surfaces of the tablet sheets S may be usable.

As shown in FIG. 1(a), the discharge portion 3 is disposed beneath the tablet sheet containing portion 1. The discharge portion 3 comprises a plurality of suction members 8 and a suction unit 10 connected to the plurality of suction members 8 via air tubes 9 so that the tablet sheet S can be sucked through the plurality of suction members 8 and the air tubes 9. Each of the suction members 8 comprises a cylindrical portion 11. On the upper end of the cylindrical portion 11 is integrally formed a flange having a suction port. The lower end of the cylindrical portion 11 is fixed through a base block 13. Between the flange 12 and the base block 13 is disposed a spring 14 so that the suction member can be pushed down. The base block 13 can be moved vertically by a motor (not shown) and so on. At a lower position, the base block 13 can be pivoted so that the suction members 8 can retreat from the bottom of the tablet sheet containing portion 1.

Operation of the tablet sheet taking out apparatus having above construction will be described hereinafter.

Initially, the tablet sheets S are taken out from a box and placed in the tablet sheet containing portion 1 as it is. At this time, as shown in FIGS. 1(a), 1(b), the shutters 5 of the tablet containing portion 1 are pivoted into the closed position while the elastic support portion 2 is moved to the standby position.

Then, as shown in FIGS. 2(a), 2(b), the elastic support portion 2 are moved to the support position so that the elastic hairs 7 can enter into the gaps between the tablet sheets S. Then, the shutters 5 are pivoted to the open position. In this state, each tablet sheet S is supported by the elastic hairs 7 of the elastic support portion 2 and therefore never drops off.

Then, the base block 13 of the discharge portion 3 is moved upward so that the flanges 12 of the suction members 8 come into contact with the lowermost tablet sheet (the first sheet) S1 which is positioned at the first position from the discharge side. If the contact portion with the flanges 12 is the front side surface F (uneven surface) of the tablet sheet S, each of the suction members 8 move vertically in compliance with the uneven surface, thereby the flanges 12 of the suction members 8 surely come into contact with the tablet sheet S. Therefore, when sucking the tablet sheet S1 via the suction port by the suction unit 10, the tablet sheet S1 can be securely held.

Then, the base block 13 is moved downward, and only the first sheet S1, which is held by the suction members 8, is moved downward against the elastic force of the elastic hairs 7. At this time, since the suction force is never applied to the second tablet sheet (second sheet) S2 from the discharge side due to the presence of the first sheet S1, the state that the second sheet S2 is supported by the elastic support portion 2 is maintained. Therefore, only the first sheet S1 can be discharged and the second sheet S2 is never discharged.

When the first sheet S1 is discharged in the above mentioned manner, the shutters 5 are pivoted to the closed position and the elastic support portion 2 is moved from the support position to the standby position so that the shutters 5 again support the tablet sheets S. Repeating the above operation allows the first sheet (lowermost) S1 from the discharge side to be discharged one after another.

The operation of the shutter 5 and the elastic support portion 2 is not necessarily conducted each time a tablet sheet S is discharged. Thus, it is also possible not to conduct such operation until the number of the tablet sheets S discharged by the discharge portion 3, one after another, reaches a predetermined number (less then the number of the tablet sheets S that can be directly supported by the elastic support portion 2).

Second Embodiment

Figure 3:
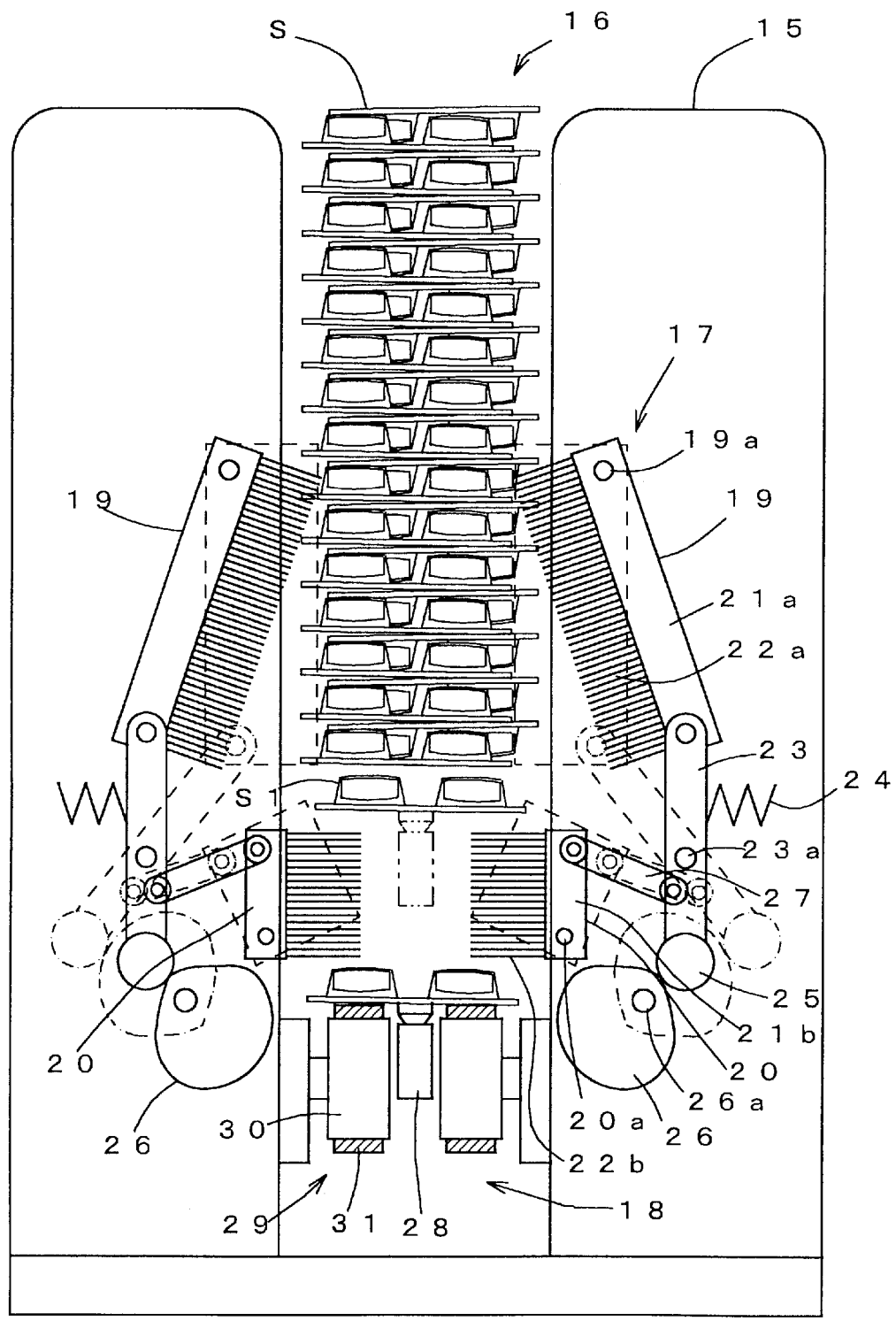
FIG. 3 is a front view showing a tablet sheet taking out apparatus on standby according to a second embodiment of the present invention.
Figure 4:
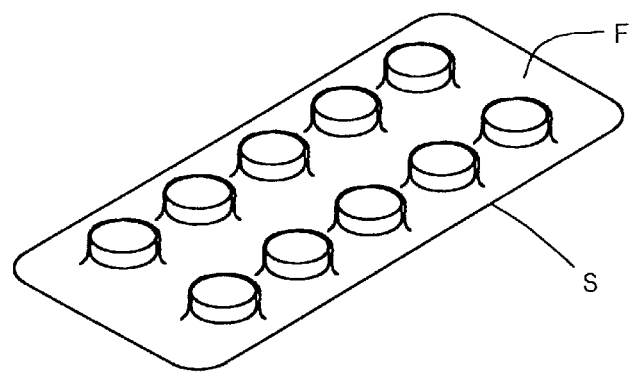
FIG. 4 is a perspective view of the tablet sheet.
Figure 5:
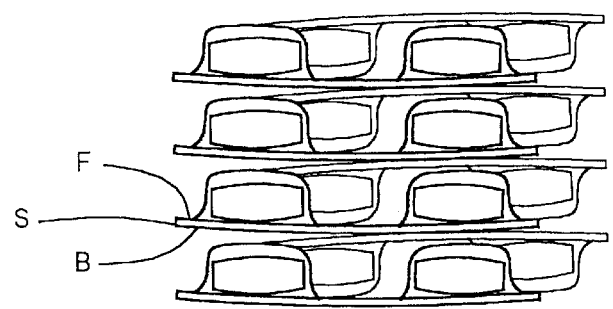
FIG. 5 is a side view showing the tablet sheets of FIG. 4 in a boxed state.
Figure 6:
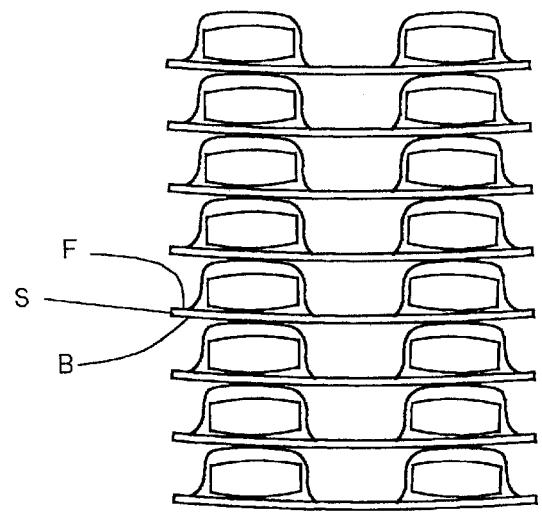
FIG. 6 is a side view showing the tablet sheets of FIG. 4 in a stacked state when setting them on a conventional dispensing apparatus.

FIG. 3 shows a tablet sheet taking out apparatus according to a second embodiment of the present invention. In this tablet sheet taking out apparatus, at a central part of a body frame 15 is formed a tablet sheet containing portion 16 for containing the tablet sheets S in a stacked state. Within the body frame 15 is provided a support portion 17 which is adapted to enter into and retreat from the tablet sheet containing portion 16. Beneath the tablet sheet containing portion 16 is provided a discharge member 18.

The support portion 17 comprises elastic support brushes 19 and pickup brushes 20. Both brushes 19, 20, in the same manner as the elastic support portion 2 described in the first embodiment, comprise holding plates 21a, 21b and a plurality of elastic hairs 22a, 22b fixed on the holding plates 21a, 21b. The upper portion of each elastic support brush 19 is supported on the body frame 15 pivotably around a support axis 19a while the lower portion thereof is pivotably connected to one end of a first arm 23. The first arm 23 is supported on the body frame 15 pivotably around a support axis 23a and urged by means of a spring 24 in such a direction that the lower ends of the elastic support brushes 19 are separated from each other. On the other end of the first arm 23 is rotatably provided a roller 25. The roller 25 runs on the peripheral surface of a cam 26 which is rotatably driven around a support axis 26a. The lower portion of each pickup brush 20 is supported on the body frame 15 pivotably around a support axis 20a. The upper portion of the pickup brush 19 and the first arm 23 are pivotably connected via a second arm 27. Thus, being driven to rotate the cam 26, the roller 25 runs on the peripheral surface of the cam 26, and thereby the support portion 17 can be positioned between: a standby position where the elastic support brushes 19 are pivoted via the first arms 23 so that the lower ends of the elastic support brushes 19 are separated from each other to retreat the elastic hairs 22a from the tablet sheet containing portion 16 while the pickup brushes 20 are entered into the tablet sheet containing portion 16 via the second arms 27; and a takeout position where the elastic hairs 22a of the elastic support brushes 19 are entered into the tablet sheet containing portion 16 to a position between the tablet sheets S while the pickup brushes 20 are retreated from the tablet sheet containing portion 16.

The discharge member 18 comprises a suction portion 28 and a belt conveyor 29. The suction portion 28 is connected to the suction unit (not shown) via an air tube (not shown) so that the tablet sheet S can be sucked via an suction port (not shown) which is opened upward. A plurality of the suction portions 28 may be provided, if necessary. The belt conveyor 29 comprises two pairs of pulleys 30 and belts 31 engaged with respective pair of pulleys 30. One of each pair of pulleys 30 is driven to convey the tablet sheet S, which is placed on the belts 31 by the suction portion 28.

Operation of the tablet sheet taking out apparatus having above construction will be described hereinafter.

Initially, the tablet sheets S are taken out from a box and placed in the tablet sheet containing portion 16 as it is, in the same manner as the first embodiment. At this time, as shown in solid line in FIG. 3, the elastic support brushes 19 are retracted from the tablet containing portion 16 while the pickup brushes 20 are protruded into the tablet sheet containing portion 16, and thereby the contained tablet sheets S are supported by the pickup brushes 20.

Then, the cams 26 are driven to rotate so that the elastic support brushes 19 are protruded into the tablet sheet containing portion 16 via the first arms 23 as shown in dotted line in FIG. 3. Thus, the majority of the tablet sheets S, within the tablet sheet containing portion 16, are supported by the elastic hairs 22a. On the other hand, the pickup brushes 20 are partly retreated from the tablet sheet containing portion 16 via the second arm 27. Thus, two or three tablet sheets S from bottom within the tablet sheet containing portion 16 are supported by the elastic hairs 22b of the pickup brushes 20.

Consequently, as shown in the two-dot chain line in FIG. 3, the suction portion 28 is moved upward to suck and hold the lowermost tablet sheet (first sheet) S1 positioned first from the discharge side. Then, moving the suction portion 28 downward, the first sheet S1 is placed on the belts 31 of the belt conveyor 29. At this time, only the elastic hairs 22b, which support the first sheet S1, are bent and the tablet sheets S which are positioned second or more from the discharge side are supported by the other elastic hairs 22b and therefore never drop off. Driving the pulleys 30 to rotate, the tablet sheet S put on the belts 31 is discharged.

Subsequently, the cams 26 are driven to rotate again, thereby retracting the elastic support brushes 19 from the tablet sheet containing portion 16 via the first arm 23 while the pickup brushes 20 are protruded into the tablet sheet containing portion 16 via the second arm 27 to prepare the next discharge operation.

In the above described embodiments, the tablet sheets S are stacked vertically so that the tablet sheet S is discharged from the bottom side. However, it is needless to say that the tablet sheets S are stacked horizontally so that the tablet sheet S is discharged from one end side. In this case, since the weight of the tablet sheets S is not applied to the elastic support portions 2, 19 as in the case of stacking the tablet sheets S vertically, the elastic support portion 2 do not need to have all that elasticity.

Furthermore, in the above embodiments, as a discharge means, such a construction that the tablet sheets S are held by suction of the air is adopted. However, it is also possible to adopt different methods, for example, suction by suction cups, adhesion by adhesive tape and so on, and suction by magnets using the tablet sheet S a part of which is formed of magnetic material.

As is clear from the above description, according to the present invention, at least two tablet sheets S positioned at the discharge side are separately supported, and thereby only the first tablet sheet S, which is positioned at the discharge side, is surely discharged by the discharge means in spite of the stacking direction of the tablet sheets, thereby enhancing handling of the tablet sheets.

Although the present invention has been fully described by way of the examples with reference to the accompanying drawings, it is to be noted that various changes and modifications will be apparent to those skilled in the art. Therefore, unless such changes and modifications otherwise depart from the spirit and scope of the present invention, they should be construed as being included therein.

What is claimed is:

1. A tablet sheet taking out apparatus comprising:
    a tablet sheet containing portion for containing a plurality of tablet sheets in a stacked state, said tablet sheet containing portion having a discharge side;
    an elastic support portion for separately supporting at least two of the tablet sheets at the discharge side of said tablet sheet containing portion; and
    a discharge means for discharging a first of the tablet sheets from the discharge side of said tablet sheet containing portion, said discharge means being operable to hold the first tablet sheet and move it so that a portion of said elastic support portion, which supports only the first tablet sheet, can be bent to permit the first tablet sheet to be removed from said tablet sheet containing portion,
    wherein said elastic support portion comprises a plurality of elastic hairs disposed in a brush-like manner, and said elastic hairs protrude in a direction toward said tablet sheet containing portion.

2. The tablet sheet taking out apparatus as claimed in claim 1, wherein said discharge means is capable of discharging tablet sheets from said tablet sheet containing portion when the tablet sheets are arranged so that front surfaces of adjacent tablet sheets are opposed to each other and when back surfaces of adjacent tablet sheets are opposed to each other.

3. The tablet sheet taking out apparatus as claimed in claim 1, wherein said discharge means comprises a suction unit that is operable to suck and hold the first tablet sheet at the discharge side of said tablet sheet containing portion.

4. The tablet sheet taking out apparatus as claimed in claim 1, wherein said elastic support portion is movable between a standby position in which said elastic support portion is retracted from said tablet sheet containing portion and a support position in which the tablet sheets contained in said tablet sheet containing portion are supported by said elastic support portion.

5. The tablet sheet taking out apparatus as claimed in claim 4, wherein said tablet sheet containing portion comprises a shutter at the discharge side of said tablet sheet containing portion, said shutter being movable between a closed position and an open position, wherein said shutter closes said tablet sheet containing portion when said elastic support portion is in the standby position, and said shutter is moved to the open position when said elastic support portion is in the support position.

6. The tablet sheet taking out apparatus as claimed in claim 1, wherein said elastic support portion comprises:

a first elastic support portion for supporting almost all of the stacked tablet sheets; and a second elastic support portion for supporting a few of the tablet sheets at the discharge side of said tablet sheet containing portion.

7. The tablet sheet taking out apparatus as claimed in claim 6, wherein said elastic support portion is movable between:

a standby position in which said first elastic support portion is retracted from said tablet sheet containing portion and said second elastic support portion protrudes into said tablet sheet containing portion; and a takeout position in which said first elastic support portion protrudes into said tablet sheet containing portion and said second elastic support portion is retracted from said tablet sheet containing portion; and wherein in the standby position, the tablet sheets contained in said tablet sheet containing portion are supported by said second elastic support portion; and in the support position, almost all of the tablet sheets contained in said tablet sheet containing portion are supported by said first elastic support portion while a few tablet sheets at the discharge side are supported by said second elastic support portion.

8. A tablet sheet discharge apparatus comprising:

a tablet sheet containing structure for containing a plurality of tablet sheets in a stacked state, said tablet sheet containing structure having a discharge side;

a pair of elastic support members movably disposed on opposite sides of said tablet sheet containing structure, wherein each of said elastic support members comprises a brush-like member formed in part by a plurality of elastic hairs protruding toward said tablet sheet containing structure; and a tablet sheet discharge device disposed below the discharge side of said tablet sheet containing structure, wherein said tablet sheet discharge device is capable of holding and removing a lowermost one of the tablet sheets from said tablet sheet containing structure, and said elastic hairs of said elastic support members are deformable to permit the lowermost one of the tablet sheets to be removed by said tablet sheet discharge device.

9. The tablet sheet taking out apparatus as claimed in claim 8, wherein the elastic support members are movable toward and away from said tablet sheet containing structure.

10. The tablet sheet taking out apparatus as claimed in claim 8, wherein said tablet sheet containing structure comprises a shutter assembly positioned at the discharge side of said tablet sheet containing structure.

11. The tablet sheet taking out apparatus as claimed in claim 10, wherein said shutter assembly comprises a plurality of shutter members pivotally mounted on a sidewall of said tablet sheet containing structure.

12. The tablet sheet taking out apparatus as claimed in claim 8, wherein said tablet sheet discharge device comprises a base block and a plurality of suction members movably mounted in said base block.

13. The tablet sheet taking out apparatus as claimed in claim 12, wherein said tablet sheet discharge device comprises a plurality of springs biasing said suction members toward said tablet sheet containing structure.

14. The tablet sheet taking out apparatus as claimed in claim 13, wherein said tablet sheet discharge device further comprises a suction unit in communication with said suction members.

* * * * *